United States Patent
Darmancier et al.

[19]

[11] Patent Number: 5,882,610
[45] Date of Patent: Mar. 16, 1999

[54] DEVICE FOR DISTRIBUTING A MULTIPHASE MIXTURE THROUGH A CATALYTIC BED

[75] Inventors: Denis Darmancier, Route Nationale Hameau de Boussole Chuzelles; Isabelle Harter, Lyon; Charles Cameron, Paris, all of France

[73] Assignee: Institut Francais du Petrole, Rueil-Malmaison, France

[21] Appl. No.: 806,379

[22] Filed: Feb. 27, 1997

[30] Foreign Application Priority Data

Feb. 27, 1996 [FR] France .................................. 96 02531

[51] Int. Cl.$^6$ ....................................................... B01J 8/02
[52] U.S. Cl. ......................... 422/220; 422/191; 422/195; 422/224; 261/97; 261/113
[58] Field of Search .................................... 422/195, 191, 422/220, 211, 224; 261/97, 113; 208/146

[56] References Cited

U.S. PATENT DOCUMENTS

| | | | |
|---|---|---|---|
| 3,112,256 | 11/1963 | Young et al. ............................. | 208/146 |
| 3,446,489 | 5/1969 | Leva ........................................ | 261/97 |
| 4,126,540 | 11/1978 | Grosboll et al. ........................ | 422/220 |
| 4,140,625 | 2/1979 | Jensen ..................................... | 208/146 |
| 5,403,561 | 4/1995 | Koros et al. ............................. | 422/195 |
| 5,456,385 | 10/1995 | Poussin et al. .......................... | 422/191 |
| 5,484,578 | 1/1996 | Muldowney et al. ................... | 422/220 |

FOREIGN PATENT DOCUMENTS

| | | |
|---|---|---|
| 0562913 | 9/1993 | European Pat. Off. . |
| 9505893 | 3/1995 | WIPO . |
| 9535159 | 12/1995 | WIPO . |

*Primary Examiner*—Hien Tran
*Attorney, Agent, or Firm*—Antonelli, Terry, Stout & Kraus, LLP

[57] ABSTRACT

The invention is a device for distributing a multiphase mixture having at least one gas phase and at least one liquid phase in which the mixture flows downwardly through at least one bed of granular solids. The device includes at least one distributor plate located above one of the at least one bed of granular solids at a distance "d" defining a space with "d" ranging from 0 to 5 cm., the distributor plate including a plurality of mixing channels in which the at least one liquid phase and the at least one gas phase of the mixture are mixed, each of the channels having at least one upper passage section and at least one lower passage section providing communication of the mixture formed in the mixing channels with the at least one bed of granular solids, the mixing channels being provided along at least part of a height thereof with at least one lateral passage section, and the upper passage section allowing a majority of the at least one gas phase of the mixture to pass and the at least one lateral passage section providing passage of the at least one liquid phase inside the mixing channels and/or at least part of the at least one gas phase, and wherein the distance "d" of separation of the distributor plate from one of the at least one bed of granular solids reduces any fragmentation of the mixture inside the space.

18 Claims, 4 Drawing Sheets

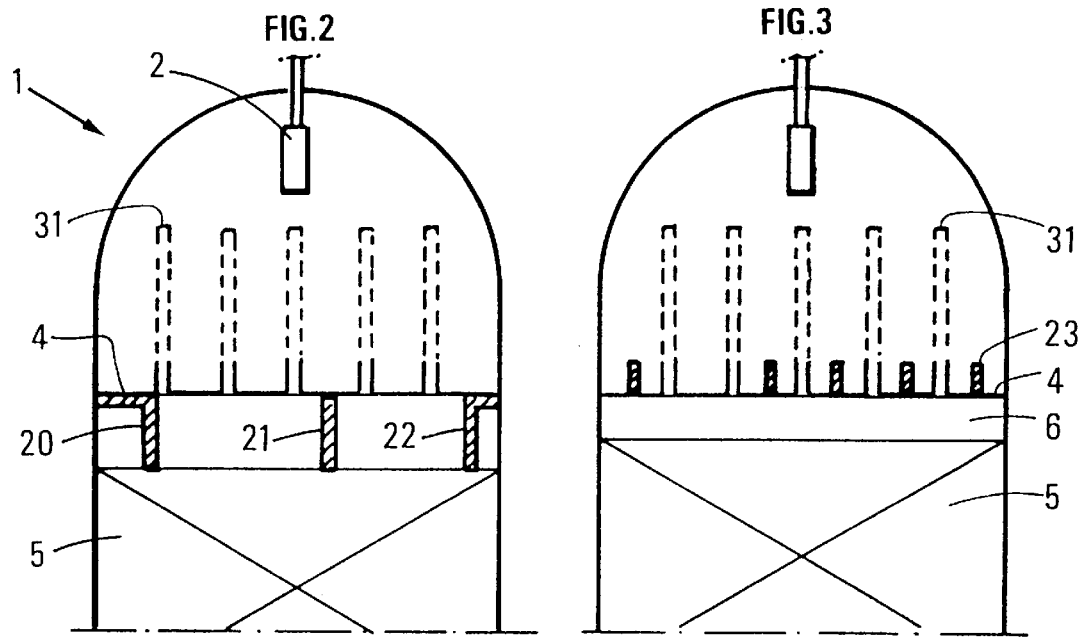
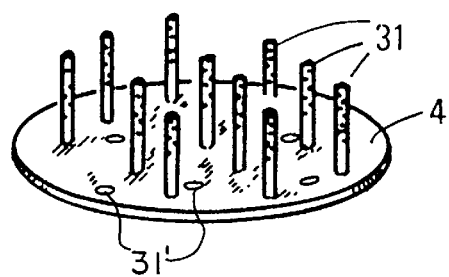
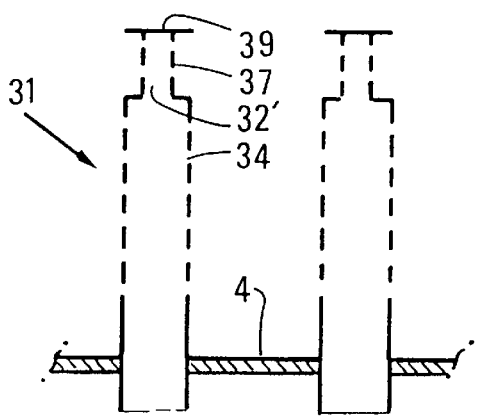
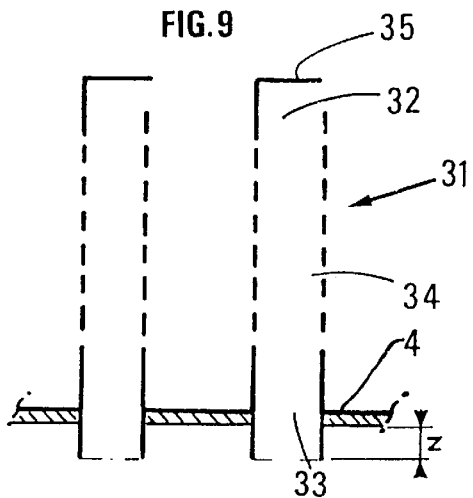

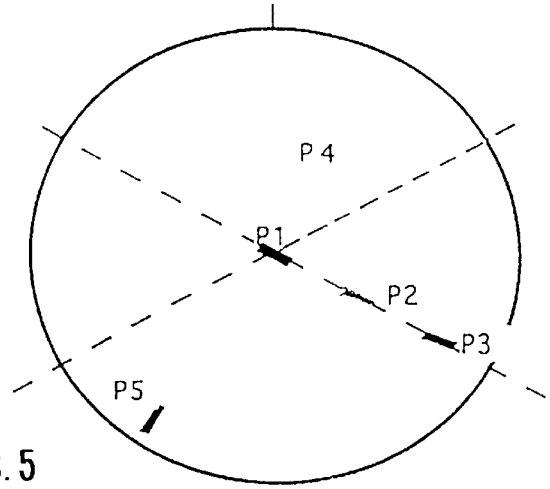
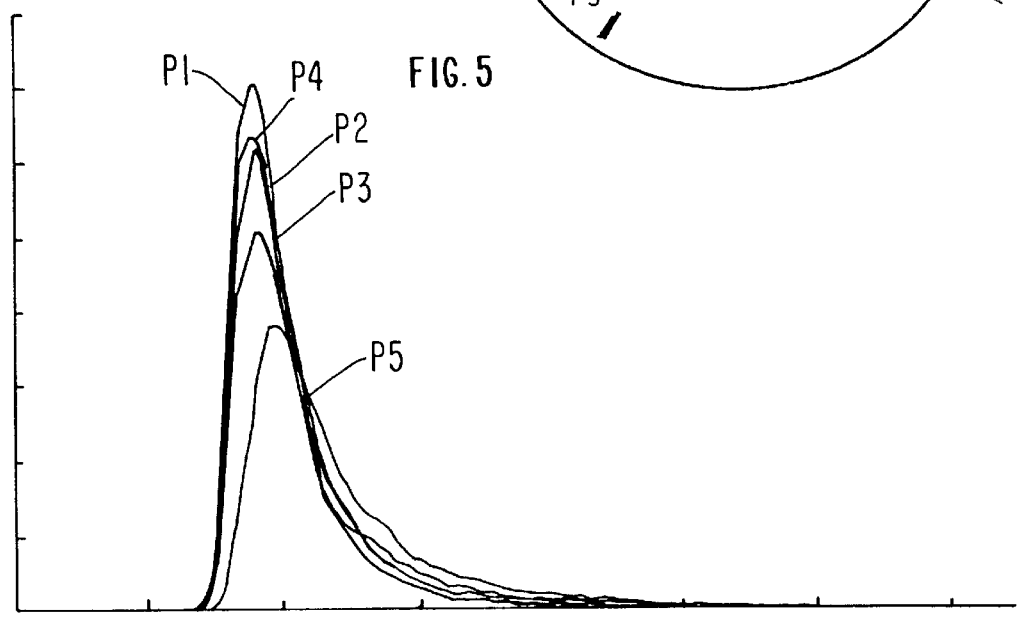
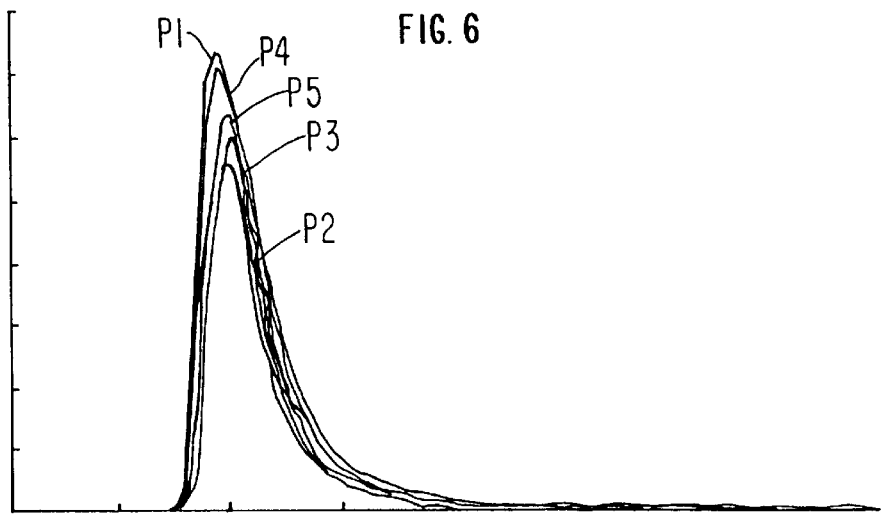

DEVICE FOR DISTRIBUTING A MULTIPHASE MIXTURE THROUGH A CATALYTIC BED

BACKGROUND OF THE INVENTION

1. Field of the Invention

The present invention relates to a device for optimizing the distribution of a fluid containing for example at least one gas phase and at least one liquid phase through a bed of granular solids or particles, with the fluid downwardly circulating through the bed.

2. Description of the Prior Art

In this field, one of the key points for achieving good hydrogenation selectivity is proper distribution of the gas and liquid at the head of the reactor or of each catalyst bed in view of the fact that the gas/liquid volumetric ratios generally range from 0.01 to 50 and most frequently from 0.02 to 20.

Thus, the individual skilled in the art is familiar with positioning the distributor plate at a relatively great distance from the catalytic bed to form a sufficient space to allow distribution of the gas phase such that the gas or gas phase is correctly distributed.

Thus, for example, U.S. Pat. No. 4,126,540 mentions the possibility of choosing the value of the distance between the distributor plate and the catalytic bed from an extensive range of values of between 7.62 cm and 91 cm. After reading this document and in accordance with normal practice, the individual skilled in the art would, as mentioned above, select the distance value from the upper part of this range rather than the lower part.

SUMMARY OF THE INVENTION

It has now been discovered that it is possible to achieve better homogeneity of the flow characteristics by selecting the value of the distance between the distributor plate and the catalytic bed by decreasing this distance, in particular, and by shifting the range of values downward from the values normally used, the latter being above the lower part of the aforesaid range. A deliberate choice of this kind runs counter to the normal practice of the individual skilled in the art, who would not consider implementing the technical teaching of U.S. Pat. No. 4,126,540 in the range of values chosen according to the invention.

Advantageously, it is still possible to improve the homogeneity of the mixture by choosing a density value for the chimneys with which the distributor plate is equipped that is significantly higher than that normally used by the individual skilled in the art, for example a density value as mentioned in U.S. Pat. No. 4,126,540. This choice is not the normal practice of the individual skilled in the art.

The present invention is particularly applicable to the field of gas/liquid distributors where the gas phase is composed at least partially of hydrogen, for example for selective or total hydrogenations of $C_3$ to $C_5$ cuts, selective hydrogenation of steam-cracked gasolines, hydrogenation of aromatic compounds in aliphatic and/or napta cuts, hydrogenation of olefins in aromatic cuts, dearsenification and/or hydrodemetallization of liquid cuts, and hydrodesulfurization, hydrocracking, isomerization, and fixed-bed catalytic reforming reactions.

The present invention is also applied to implementation of other reactions requiring good mixing of a gas phase and a liquid phase, for example, partial or total oxidation reactions and amination, acetyloxidation, ammoxidation, and chlorination reactions.

The present invention relates to a device for distributing a two-phase or multiphase mixture having at least one gas phase and at least one liquid phase with the mixture flowing downwardly through at least one bed of granular solids, comprising:

at least one distributor plate located above one of the beds of granular solids at a distance "d" defining a space;

several mixing channels of the liquid and gas phases of the mixture, each of the channels having at least one upper passage section and at least one lower passage section allowing communication of the mixture formed in the mixing channels with a bed of granular solids, the mixing channels being provided on at least part of their height with one or more lateral passage sections;

the upper passage section allowing the majority of the gas phase of the mixture to pass and the lateral passage sections allow passage of the liquid phase inside the mixing channels and/or at least part of the gas phase.

The value of the distance "d" is chosen to avoid fragmentation of the mixture coming from the mixing channels inside the space.

The mixture coming from the mixing channels is preserved while it traverses the space until it contacts the head of the catalytic bed.

The value of distance "d" is for example between 0 and 10 cm, preferably between 0 and 5 cm, and preferably between 0 and 2 cm.

The mixing channels are extended below the distributor plate for a length "z" less than or equal to "d"/2.

The distributor plate advantageously has at least one support disposed on its upper face and/or below the bottom of the plate.

The density of the mixing channels is for example chosen to be greater than 80 channels per square meter and preferably greater than 90.

Thus the mixing areas of the two phases and the distribution points of the mixture thus formed are multiplied.

The density of the mixing channels with which the distributor plate is equipped is for example between 100 and 700 chimneys per square meter and preferably within the range of 150 to 500.

The mixing channels can be equipped to allow the various liquid and gas phases of the multiphase mixture to be guided such as to deflect the flow of the liquid phase of the upper passage section and for the majority of the gas phase to pass through this passage section.

The value of the diameter of the mixing channels is within the range (0.3; 8 cm) and preferably in the range (0.3; 5 cm).

For one mixing channel, the total surface area of the lateral passage sections corresponding for example to the sum of the surface areas of all the lateral passage sections is at least equal to the value of lower passage section of one mixing channel. The lateral passages may be in the form of slots and/or orifices.

The distributor plate can have one or more orifices for draining the liquid phase, the total surface area resulting from the sum of the passage surfaces of each of the orifices being such that the flowrate of the liquid phase through the drainage orifices is less than 10% of the fraction of the liquid phase during operation and preferably less than 5%.

The device according to the invention is advantageously applicable to the distribution of a two-phase or multiphase mixture containing at least one gas phase that includes hydrogen at least in part.

Thus the device according to the invention is particularly applicable to distribution of a mixture, for example for selective or total hydrogenation of $C_3$ to $C_5$ cuts, selective hydrogenation of steam-cracked gasolines, hydrogenation of aromatic compounds in aliphatic and/or naphtha cuts, hydrogenation of olefins in aromatic cuts, dearsenification and/or hydrodemetallization of liquid cuts, and hydrodesulfurization, hydrocracking, isomerization, and fixed-bed catalytic reforming reactions.

The device according to the invention offers in particular the following advantages over the devices described in the prior art:

By choosing the distance between the distributor plate and the bed of granular solids, separation or fragmentation of the mixture formed inside the channels before it contacts the catalytic bed, particularly when it is distributed in the space, is avoided.

Since the plate is of the self-supporting type, its distance from the catalytic bed is easily adjustable to a minimum value and such a design minimizes the obstacles encountered by the fluid.

By selecting the number of mixing channels, for example the chimneys with which the distributor plate is equipped, mixing is improved and thus contact of each of the phases, liquid and gas, with the bed of granular solids or catalytic bed is improved.

BRIEF DESCRIPTION OF THE DRAWINGS

Other advantages and characteristics of the invention will emerge from the description provided hereinbelow of embodiments within the context of applications that are not limited to selective dehydrogenization, with reference to the attached drawings wherein:

FIGS. 2 and 3 represent two embodiments of the device according to the invention where the distance between the distributor plate and the catalytic bed respects a given value;

FIGS. 5 and 6 show distribution curves of the mean tracer concentration obtained with the aid of the devices described in FIGS. 2 and 3 representing the influence of distance;

FIG. 7 shows the distribution of measuring points in one section of a catalytic bed;

FIG. 8 shows schematically a distributor plate provided with several chimneys;

FIGS. 9 and 10 show sample geometries of chimneys with which the distributor plate is equipped.

DESCRIPTION OF THE PREFERRED EMBODIMENTS

For better understanding of the invention, the description provided hereinbelow as a nonlimiting example relates to a distribution system used in a reactor designed for selective hydrogenization of unsaturated compounds contained in the $C_3$ to $C_5$ cuts of a fluid including hydrocarbons. However, the device according to the invention can be used in all the reactions listed above.

This system may, without departing from the framework of the invention, be used in any device and any field where it is desirable to achieve good distribution of a two-phase or multiphase fluid, namely a fluid with several phases with different densities. The phases may be gas, liquid, and/or solid.

Figure 1:
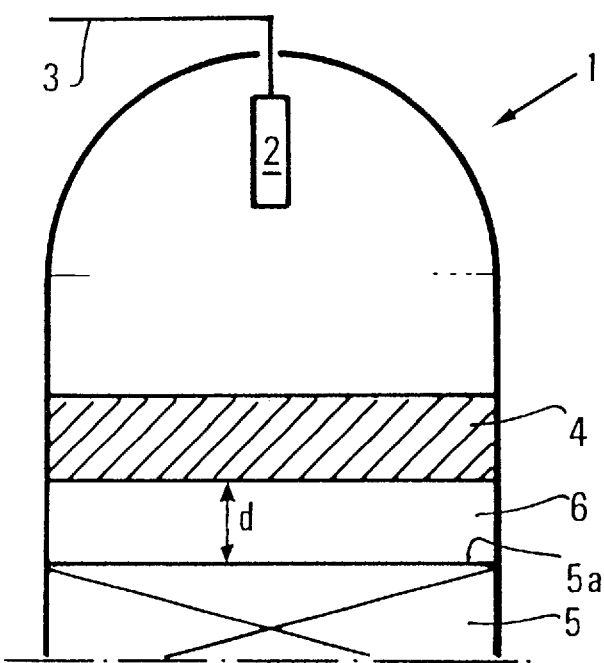
FIG. 1 shows schematically a reactor with a distributor plate having the specific characteristics of the present invention.

FIG. 1 shows schematically a distribution system used for example in a column such as a reactor designed for selective hydrogenization of the unsaturated compounds contained in the $C_3$ to $C_5$ cuts of a fluid containing hydrocarbons.

The reactor shown schematically in FIG. 1 has for example an enclosure 1 whose upper part or reactor head contains an inlet predistributor 2. The mixture, for example made of hydrogen and a fluid containing hydrocarbons, is formed downstream of the reactor and injected by a pipe 3 communicating with inlet predistributor 2.

The mixture distributed by inlet predistributor 2 flows down to distributor plate 4 which is located above and at a distance "d" from the first bed of granular solids 5 or catalytic bed. The head of catalytic bed 5a as well as distributor plate 4 defines, with the walls of the reactor, a space 6 whose height may be made to vary for example to improve contact between the mixture coming from the chimneys and the head of the catalytic bed as described hereinbelow.

Distributor plate 4 and the mixing channels with which it is equipped will be described in greater detail in FIGS. 8, 9, and 10.

One of the characteristics of the device according to the invention resides in the choice of the distance between the distributor plate and the catalytic bed which, in the example provided for illustration hereinbelow, corresponds to the height of space 6.

The distance "d" between the distributor plate and the head of the catalytic bed is a parameter that influences the behavior of the mixture obtained inside the chimneys, particularly its stability outside the chimney, due to the differences in flowrates between the liquid phase and the gas phase.

Advantageously, as is proved hereinbelow with reference to FIGS. 5 and 6, for good stability of the mixture it is necessary that, once it leaves the chimneys, the value of distance "d" be chosen to be as small as possible.

In order practically to make distance "d" smaller than the distances normally chosen by an individual skilled in the art, one method is to use a distributor plate of the "self-supporting" type.

The plate has at least one support formed for example by several beams located on the distributor plate. Such an arrangement advantageously allows the fluid to circulate in the space below the distributor plate, minimizing obstacles that might be factors in fragmentation or splitting of the mixture formed inside the chimneys.

The distance "d" is chosen for example in the range of values (0, 10 cm), preferably in the range (0, 5 cm), and still more preferably in the range (0, 2 cm).

FIGS. 2 and 3 show two embodiments of a system according to the invention.

The reactor described in FIG. 2 shows a distributor plate equipped with three beams 20, 21, 22 placed below the bottom of the distributor plate, one of which is disposed substantially at the center of the plate along the axis of the reactor while the other two beams are for example located at the outer edges of the distributor plate in the vicinity of the inside walls of enclosure 1.

Beams 20, 21, and 22 have for example the following geometric characteristics: a height of approximately 7 cm and a thickness of approximately 10 mm in order to hold the distributor plate equipped with chimneys. The height of the beams is advantageously chosen to bring the distributor plate as close as possible to the catalytic bed.

FIG. 3 shows schematically another arrangement of the distributor plate according to the invention offering the possibility of decreasing the separation distance.

The supports are formed by integrated stiffeners 23 disposed on the upper face of the distributor plate.

The stiffeners are provided with holes to allow the liquid phase to circulate freely on the plate and prevent formation of voids.

It should be understood that, without departing from the framework of the invention, the distributor plate may be equipped with a support located on the plate as shown in FIG. 3 and at the same time below the plate as shown in FIG. 2.

The effect of the distance between the distributor plate and the head of the catalytic bed is determined for example by measuring residence time distribution, the principle of which is shown schematically in FIG. 6.

The results shown in the curves of FIGS. 5 and 6 were obtained:

with a two-phase mixture in downward cocurrent flow containing nitrogen and heptane in a volume ratio of 0.5, a column with a diameter of 400 mm and a height of 4 mm operating under pressure conditions of 4 to 10 bars absolute, a catalytic bed consisting of granular solids whose grain size ranges from 1.2 to 2.4 mm, and respectively with distributor plates having a chimney density of substantially approximately 438.

The curves in FIG. 5 were obtained for a reactor with a distributor plate disposed at a distance of 10 cm from the catalytic bed according to a prior art design and the curves of FIG. 6 were obtained for a distributor plate positioned approximately 2 cm from the catalytic bed.

Figure 4:
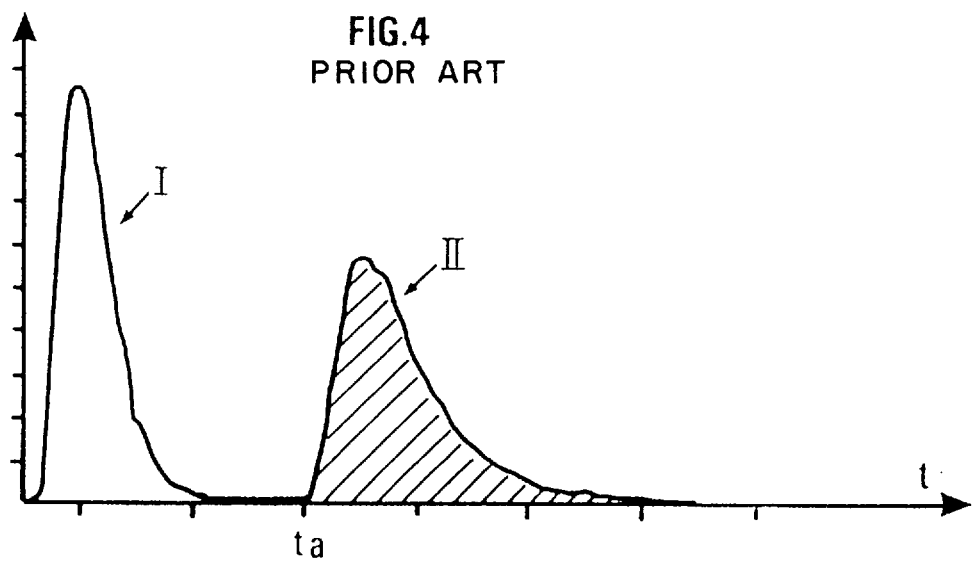
FIG. 4 shows a curve representing the distribution of the residence time of a fluid in the catalytic bed.

The principle described in relation to FIG. 4 is the following: at time t=0, a tracer, such as isohexadecane for example, is introduced into the principal fluid, (heptane for example). The signals are: the input signal (curve I) and the output signal (curve II) obtained at a later time t. This signal is considered to be the input signal (I). At a later time t, the shape of signal (II) or output signal is observed. The parameters are analyzed; "ta" for the output signal to appear and the area under the signal shape which represents the mean tracer concentration at a given point in time, hence the dispersion of the composition of the liquid.

These measurements are taken at several points of the same section of the catalytic bed, for example at sampling points numbered P1, P2, P3, P4, and P5 in FIG. 7 and, in the two examples that follow, the sampling points are located in the same section of the catalytic bed, located approximately 40 cm below the bottom of the plate.

Two series of measurements are made for two positions of this distributor plate relative to the catalytic bed and the various curves obtained are plotted. The abscissa axis represents time and the ordinate axis represents tracer fluid concentration.

The five curves shown in FIG. 5 are obtained for a distributor plate 4 approximately 10 cm from the head of the catalytic bed (according to the prior art) show some disparity in the value of the areas, particularly the peak heights showing a difference in terms of quantity of liquid from one sampling point to another. Differences in the times for the signals to appear are also noted.

On the other hand, as illustrated in FIG. 6 the curves obtained for the same sampling points but for a distance of approximately 2 cm between the distributor plate and the head of the catalytic bed, namely chosen according to the invention, are more closely grouped. This grouping expresses a smaller disparity in the tracer concentration value, hence a more homogeneous liquid distribution for a given catalytic bed section.

These results tend to confirm the fact that it is preferable to dispose the distributor plate at a distance chosen according to the invention to prevent fragmentation of the mixture leaving the chimneys, and particularly in one of the above ranges.

Advantageously, the plate according to the invention has a density of mixing channels or chimneys that is chosen to improve mixing of the various fluid flow phases. The number of chimneys 31 is preferably chosen to obtain a density per square meter of greater than 80 and preferably greater than 90. This value is preferably between 100 and 700 chimneys per square meter and still more preferably in the range of 150 to 500.

For chimneys with a cylindrical geometry, the diameters of chimneys 31 are for example in the range (0.3; 8 cm) and preferably in the range (0.3; 5 cm).

Two examples of geometries for these mixing channels are given below indicatively and not as a limitation in FIGS. 9 and 10.

A distributor plate 4 (FIGS. 8, 9, and 10) has for example a plurality of mixing channels such as chimneys 31 each of which has at least one upper passage section 32 (FIGS. 9 and 10), for example one orifice at its upper part and a lower passage section 33 (FIG. 9) in its lower part at the level of the distributor plate. The upper part of the chimney can thus be beveled (FIG. 9). The chimneys are provided, for example at least in part on their side walls, for example in the case of a tubular geometry, with one or more passage sections 34 distributed over at least part of the height of chimney 31.

The lateral passage sections can be of different shapes, for example they may be in the form of orifices with different geometries and/or one or more slots.

Preferably, a minimum height h is provided between the upper face of the distributor plate (the face receiving the liquid phase) and the first lateral passage sections covered by the rise in the liquid phase. This means that the orifices located in the lower part of the chimney or, in the case of a slot, the bottom of the slot, are above height "h."

Height "h" is preferably between 5 mm and 25 cm.

The total lateral passage section resulting from the sum of all the lateral passage sections of the chimneys is preferably equal to at least the area of the lower passage section of the chimney. The hole diameter is equal to a maximum of 75% of the diameter of the corresponding chimney, for example less than 6 cm, preferably less than 3.75 cm, but at least equal to or greater than 1 mm.

One means of conferring a certain direction on the liquid and gas phases, such as a baffle 35, is disposed for example at the upper part of chimney 31. Thus, in FIG. 9, baffle 35 avoids a direct flow of the liquid phase through the upper passage section 32 of chimney 31. The size of this baffle is equal to at least the upper passage section of the chimney.

During operation, the multiphase mixture distributed by predistributor 2 flows as follows: the gas phase penetrates one of the chimneys through its upper opening or upper passage section 32 while its liquid phase is deflected by baffle 35. The majority of this liquid phase falls onto plate 4 where it accumulates. Due to this accumulation, the liquid level rises and gradually covers lateral passage sections 34 with the liquid passing through to penetrate inside chimney 31. The gas phase principally penetrates inside chimney 31 via passage section 32 located at the upper part of the chimney but also through the passage sections 34 not covered with liquid as the phase is above the level of the liquid. The liquid and gas phases separated by the baffle and penetrating inside chimneys 31 become mixed inside to form a mixture flowing through the lower orifice, space 6 (FIG. 1) before contacting the head of the catalytic bed.

Advantageously, the mixing channels extend below distributor plate 4 over a distance "z" to prevent the liquid phase of the mixture coming from the channels from flowing along the lower face of the mixing plate. This prevents fractionation of the mixture formed inside the channels before it contacts the catalytic bed. The value of distance "z" is for example less than "d"/2.

The two-phase gas/liquid distribution produced by the large number of chimneys 31 on the plate creates bubbles dispersed in the chimneys 31 and thus allows for more homogeneous distribution at the head of and within the catalytic bed.

Distributor 4 advantageously has drainage orifices 31'. These drainage orifices 31' allow the liquid phase to be evacuated when the reactor is turned off. The total surface area of the drainage orifices is chosen so that the flow of liquid phase through the drainage orifices is less than 10% of the fraction of the liquid phase during reactor operation and preferably less than 5%.

FIG. 10 shows another embodiment of a chimney 31 that can be installed on the plate, differing principally from the embodiment of FIG. 9 by the position of the baffle. Chimney 31 shown in FIG. 10 has substantially identical characteristics for lower and upper passage sections 33 and 32' and lateral passage sections 34 identical to those of chimney 31 (FIG. 9). In this embodiment, baffle 39 is connected to chimney 31 by two mounting means 37 such as tabs. The number of tabs and their geometric characteristics are chosen such as not to impede passage of the gas phase inside the chimney.

Passage of the phases is effected in a substantially identical manner to the manner described with respect to FIG. 9. The mixture formed inside the chimneys and emerging therefrom is then made to contact the upper part of the catalytic bed or bed head after passing through space 6 (FIG. 1).

The distributor plate according to the invention is particularly well suited for distributing a liquid-gas mixture through a reactor having one or more beds of granular solids or catalysts, and the right mixture leaving the chimneys allows either the selectivity of the desired product (in the case of selective reactions) to be improved or the content of undesired products in the effluent to be improved (by decreasing it for example), for example in dearsenification or total hydrogenization reactions, or the operating cycle to be increased.

Efficiency measurements in such a device for gas-liquid distribution in a section of a catalytic bed have been made by measuring the gas levels locally with an optical fiber. The principle of these measurements is based on the variation in light reflection as a function of the medium in which the end of an optical fiber is immersed so that, for a given length of time, the quantity of gas passing near the optical fiber can be determined. After appropriate statistical processing, the difference in the indices of reflection of the gas and liquid phases is sufficient to distinguish the proportion or percentage of the gas phase relative to the liquid phase at a given point in the reactor section.

Figure 11:
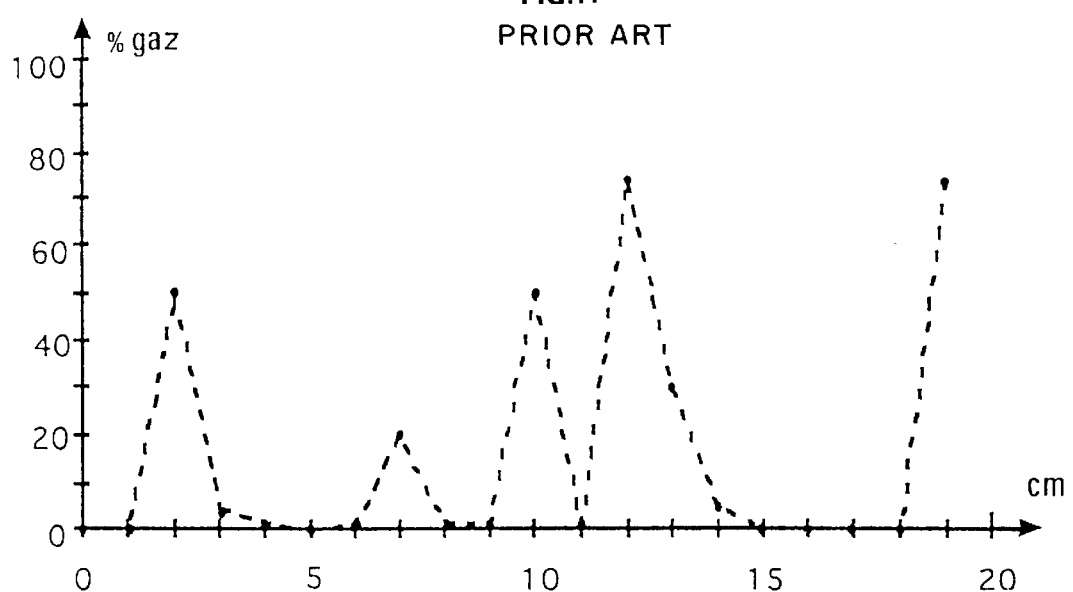
FIGS. 11 and 12 show respectively the distribution of the gas phase in the catalytic bed obtained using a device according to the prior art and according to the present invention.
Figure 12:
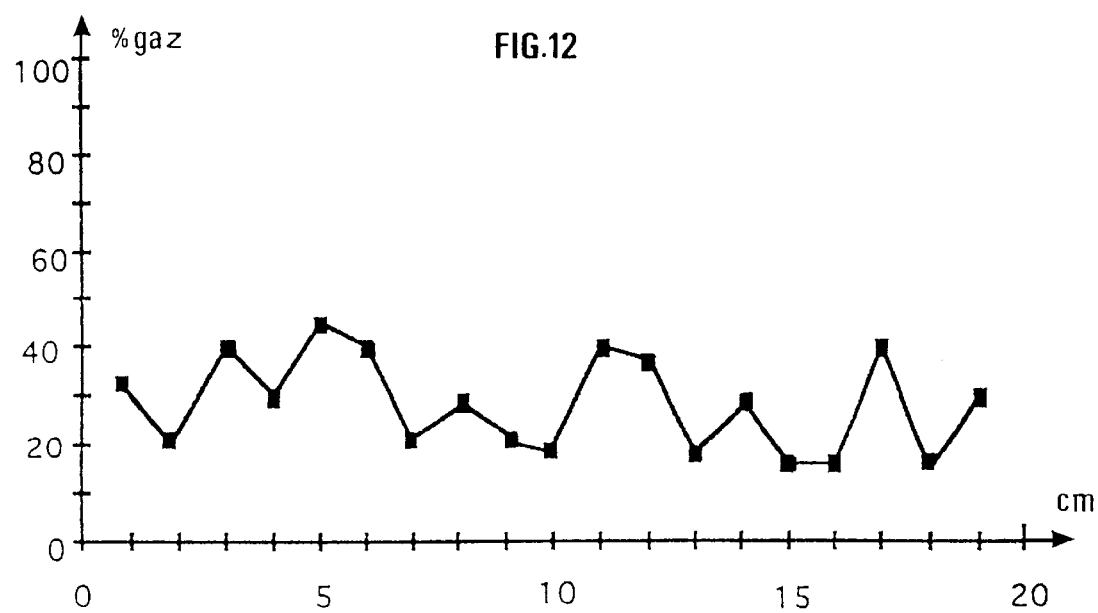

The results shown in the curves of FIGS. 11 and 12 were obtained:

with a two-phase mixture in downward cocurrent flow containing nitrogen and heptane in a volume ratio of 0.5, a column 400 mm in diameter, 4 m high, and operating under pressure conditions of 4 to 10 bars absolute, a catalytic bed composed of granular solids whose grains have sizes ranging from 1.2 to 2.4 mm, a distance of 10 cm between the distributor plate and the catalytic bed, and with distributor plates having the following characteristics:

for the distributor plate according to the prior art corresponding to the results shown in FIG. 11, a chimney density of approximately 64, with the plate having eight chimneys with an inside diameter of 50 mm, each of the chimneys having twenty 15 mm holes distributed over the height of the chimney in 10 rows, these rows being spaced 35 mm apart. The upper part of each chimney is provided with a baffle 39 with a diameter of approximately 65 mm and the baffle is connected to chimney 31 by two tabs, for example 37 (FIG. 10).

for the distributor plate according to the invention, corresponding to the results of FIG. 12, a chimney density of substantially 438 per square meter, the plate having 55 chimneys with a diameter of 10 mm and having 20 passage orifices 24 of 5 mm, which are distributed over the height of the chimney in 10 rows, the rows being approximately 25 mm apart, the baffle diameter being for example approximately 10 mm (FIG. 9).

The measure consisted of introducing the fiber at the level of one reactor section located approximately 40 cm below the bottom of the distributor plate, initially positioning it in the center of the reactor, then displacing it horizontally centimeter by centimeter in order to obtain a series of measurements on one radius of the reactor.

For the two curves shown in FIGS. 11 and 12, the abscissa axis represents the position of the measuring fiber in the reactor, referenced to the wall of the column, and the ordinate axis represents the percentage of gas relative to liquid.

FIG. 11 obtained from a reactor equipped with a distributor plate having a chimney density according to the prior art shows a gas percentage distribution that varies sharply from one measuring point to another. This variation represents zones for which the presence of gas is practically zero, hence points at which the catalytic bed is practically bathed by a largely liquid phase and not a liquid-gas mixture. It is in the range (0%, 80%).

On the other hand, in FIG. 12 that shows the measurements made with a distributor plate having a chimney density according to the present invention, a variation in gas percentage within a far smaller range (between 15 and 45%) is observed, expressing better homogeneity of the gas phase distribution in the catalytic bed.

Measurements taken from various points of the reactor, for various catalytic sections, or in the same section but with different radii, show that the gas phase is still present and in contact with the catalytic bed, thus avoiding the presence of the liquid column found in the reactors of the prior art.

We claim:

1. A device for distributing a multiphase mixture having at least one gas phase and at least one liquid phase, comprising:
   - at least one bed of granular solids through which the multiphase mixture flows;
   - at least one distributor plate located above at least one of the at least one bed of granular solids at a distance "d" defining a space with "d" ranging from 0 to 5 cm.;
   - the distributor plate including a plurality of mixing channels in which the at least one liquid phase and the at least one gas phase of the mixture are mixed, each of the channels having at least one upper passage section and at least one lower passage section providing communication of the mixture formed in the mixing channels with the at least one bed of granular solids, the mixing channels being provided along at least part of a height thereof with at least one lateral passage section; and
   - the upper passage section allowing a majority of the at least one gas phase of the mixture to pass and the at least one lateral passage section providing passage of the at least one liquid phase inside the mixing channels and/or at least part of the at least one gas phase; and wherein
   - the distance "d" of separation of the distributor plate from one of the at least one bed of granular solids reduces any fragmentation of the mixture inside the space.

2. A device according to claim 1, wherein value of distance "d" is between 0 and 2 cm.

3. A device according to claim 1 wherein the mixing channels extend below the distributor plate for a length "z" less than or equal to d/2.

4. A device according to claim 2 wherein the mixing channels extend below the distributor plate for a length "z" less than or equal to d/2.

5. A device according to claim 1, wherein the at least one distributor plate has at least one support disposed on an upper face and/or below the at least one distributor plate.

6. A device according to claim 2, wherein the at least one distributor plate has at least one support disposed on an upper face and/or below the at least one distributor plate.

7. A device according to claim 3, wherein the at least one distributor plate has at least one support disposed on an upper face and/or below the at least one distributor plate.

8. A device according to claim 4, wherein the at least one distributor plate has at least one support disposed on an upper face and/or below the at least one distributor plate.

9. A device according to claim 1 wherein a density of the plurality of mixing channels is greater than 80 channels per square meter.

10. A device according to claim 2 wherein a density of the plurality of mixing channels is greater than 90 per square meter.

11. A device according to claim 1, the density of the mixing channels attached to the plate is between 100 and 700 chimneys per square meter.

12. A device according to claim 1, the density of the mixing channels attached to the plate is between 150 and 500 chimneys per square meter.

13. A device according to claim 1 wherein the plurality of mixing channels guide the at least one liquid and gas phase of the multiphase mixture to prevent passage of the at least one liquid phase through the upper section.

14. A device according to claim 1 wherein the plurality of mixing channels have a diameter between the range of 0.3 to 8 cm, and wherein the multiphase mixture has at least one gas phase including at least in part hydrogen.

15. A device according to claim 1 wherein the plurality of mixing channels have a diameter between the range of 0.3 to 5 cm.

16. A device according to claim 1 wherein for each mixing channel a total surface area of the at least one lateral passage section is at least equal to a surface area of a lower passage section of each mixing channel.

17. A device according to claim 1 wherein the at least one distributor plate is provided with drainage orifices for draining the at least one liquid phase and a total surface area resulting from a sum of passage surface areas of each of the drainage orifices is such that a flowrate of the at least one liquid phase through the drainage orifices is less than 10% of a fraction of the at least one liquid phase during operation.

18. A device according to claim 1 wherein the plate is provided with drainage orifices for draining the at least one liquid phase and a total surface area resulting from a sum of passage surface areas of each of the drainage orifices is such that a flowrate of the at least one liquid phase through the drainage orifices is less than 5% of a fraction of the at least one liquid phase during operation.

* * * * *